United States Patent
Lenga et al.

(10) Patent No.: US 11,880,432 B2
(45) Date of Patent: Jan. 23, 2024

(54) CONFIDENCE MEASURE FOR A DEPLOYED MACHINE LEARNING MODEL

(71) Applicant: KONINKLIJKE PHILIPS N.V., Eindhoven (NL)

(72) Inventors: Matthias Lenga, Hamburg (DE); Rafael Wiemker, Kisdorf (DE); Tobias Klinder, Uelzen (DE); Marten Bergtholdt, Hamburg (DE); Heike Carolus, Ahrensburg (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 353 days.

(21) Appl. No.: 17/426,759

(22) PCT Filed: Jan. 21, 2020

(86) PCT No.: PCT/EP2020/051317
§ 371 (c)(1),
(2) Date: Jul. 29, 2021

(87) PCT Pub. No.: WO2020/156864
PCT Pub. Date: Aug. 6, 2020

(65) Prior Publication Data
US 2022/0101626 A1  Mar. 31, 2022

(30) Foreign Application Priority Data
Feb. 1, 2019  (EP) .................................. 19154992

(51) Int. Cl.
*G06V 10/776*  (2022.01)
*G06F 18/2413*  (2023.01)
(Continued)

(52) U.S. Cl.
CPC ......... *G06F 18/2413* (2023.01); *G06N 20/00* (2019.01); *G06T 3/0093* (2013.01); *G06V 10/776* (2022.01); *G06V 10/82* (2022.01)

(58) Field of Classification Search
None
See application file for complete search history.

(56) References Cited

U.S. PATENT DOCUMENTS 6,226,544 B1 *  5/2001  Yamazaki .............. A61B 5/372
                                                324/309
9,373,087 B2 *  6/2016  Nowozin ................ G06N 20/00
(Continued)

FOREIGN PATENT DOCUMENTS

WO  2005001740 A2  1/2005
WO  2017001210 A1  1/2017

OTHER PUBLICATIONS

PCT/EP2020/051317, ISR & WO, Apr. 17, 2020, 16 Page Document.
(Continued)

*Primary Examiner* — Tsung Yin Tsai (57) ABSTRACT

Presented are concepts for obtaining a confidence measure for a machine learning model. One such concept process input data with the machine learning model to generate a primary result. It also generate a plurality of modified instances of the input data and processes the plurality of modified instances of the input data with the machine learning model to generate a respective plurality of secondary results. A confidence measure relating to the primary result is determined based on the secondary results.

8 Claims, 3 Drawing Sheets

(51) Int. Cl.
    *G06N 20/00*    (2019.01)
    *G06V 10/82*    (2022.01)
    *G06T 3/00*     (2006.01)

(56) References Cited

U.S. PATENT DOCUMENTS

| | | | |
|---|---|---|---|
| 2014/0122381 A1* | 5/2014 | Nowozin | G06N 20/00 706/12 |
| 2014/0172753 A1* | 6/2014 | Nowozin | G06N 20/00 706/12 |
| 2018/0075599 A1* | 3/2018 | Tajbakhsh | G06T 1/0007 |
| 2018/0253839 A1 | 9/2018 | Zur | |
| 2021/0012230 A1* | 1/2021 | Hayes | G06N 5/048 |
| 2021/0209509 A1* | 7/2021 | Martin | G06F 16/258 |
| 2021/0382052 A1* | 12/2021 | Joung | B01L 3/502715 |

OTHER PUBLICATIONS

Bhat et al: "Deepcancer: Detecting Cancer Through Gene Experessions via Deep Generative Learning":arxiv.org, Cornell University, Dec. 2016, 10 Page Article.

Tourassi et al: "Evaluation of Information—Theoretic Similarity Measures for Content-Based Retrieval and Detection of Massess in Mammograms"; Med. Phys. 34 (1), Jan. 2007, pp. 140-.

Megas Da Sliva et al: "PCA and Gaussian Noise in MLP Neural Network Training Improve Generalization in Problems With Small and Unbalanced Data Sets"; Proceedings of the International Joint Conference on Neural Networks, San Jose, California, Jul. 31-Aug. 5, 2011, pp. 2664-2669.

* cited by examiner

CONFIDENCE MEASURE FOR A DEPLOYED MACHINE LEARNING MODEL

CROSS-REFERENCE TO PRIOR APPLICATIONS

This application is the U.S. National Phase application under 35 U.S.C. § 371 of International Application No. PCT/EP2020/051317, filed on Jan. 21, 2020, which claims the benefit of European Patent Application No. 19154992.2, filed on Feb. 1, 2019. These applications are hereby incorporated by reference herein.

FIELD OF THE INVENTION

This invention relates generally to machine learning, and more particularly to obtaining a confidence measure for a deployed machine learning model.

BACKGROUND OF THE INVENTION

Recent technological advances have led to the use of Machine Learning (ML) models that are designed to assist in data analysis (e.g. for the purpose of identifying medical features and/or making clinical decisions). Typical data analysis applications include recognition, delineation (e.g. semantic segmentation, voxel labelling), and classification (e.g. categorization).

ML models are typically trained using a training dataset that is of limited size and/or variability. For instance, in the medical domain, the variability of training data represent is limited due to the lack of large databases. So-called 'augmentation' methods are therefore commonly employed to increase the size and/or variability of training datasets in order to improve performance, reliability and/or robustness of ML models.

After training and deployment, finalized (fixed) ML models are used by clients to evaluate input data (e.g. new medical cases).

For a client (i.e. at the client-side), a ML component/ system is typically a closed/fixed 'black box' configured to receive input data and generate/output a result or decision based on the input data. Thus, in typical use cases, a ML component/system is 'sealed' (or fixed) and it is not possible to perform client-side retraining of the ML model. Such sealing (or fixing) of a ML component/system may be due to many differing reasons, including, for example: limited computational resources; licensing issues; the unfeasibility of on-site label correction; or FDA restrictions.

SUMMARY OF THE INVENTION

The invention provides systems and methods as defined in the independent claims. The dependent claims provide advantageous embodiments.

There is provided a method for obtaining a confidence measure for a machine learning, ML, model, the method comprising: processing input data with the ML model to generate a primary result; generating a plurality of modified instances of the input data; processing the plurality of modified instances of the input data with the ML model to generate a respective plurality of secondary results; determining a confidence measure relating to the primary result based on the secondary results.

Proposed is a concept for determining a measure of confidence (i.e. a confidence measure) relating to a deployed ML model. In particular, it is proposed that a confidence measure may be determined by modifying (or augmenting) input data and analysing results provided by the ML model for the modified (or augmented) input data. Such a proposal may rely upon a concept that an acceptable ML model should be 'well-behaved', e.g. such that small perturbations to input data should have small, corresponding effects on the model output.

For instance, input data may be automatically subjected to a number of modifications (or augmentations), which are subsequently processed by the ML model. Based on the results associated with the modified (or augmented) data, variations in the results may be analysed to assess the robustness or variability of the results. This may enable a confidence measure for the ML model to be determined. For example, a confidence measure that is specific to certain input data may be determined, and this may be based on a variance of results provided by the ML model processing modified (or augmented) versions of the specific input data.

Proposed embodiments may, for example, be useful for identifying if a result of a client-side ML model (e.g. provided by processing specific input data) is reliable.

Furthermore, embodiments may facilitate the provision of additional information relating to an uncertainty associated with an output or result of a ML model.

Proposed embodiments may therefore be particularly advantageous for applications where it is preferable to indicate a perceived accuracy or reliability of a deployed (e.g. client-side) ML model output. By way of example, this may be especially important in the healthcare domain, where medical practitioners need to understand and assess ML model results (and accept or adapt a ML model's decision accordingly).

Unlike conventional ML models (which may be provided with an indication of a global/general confidence level, e.g. by the model-provider), proposed embodiments may provide a confidence measure that is specific to input data (e.g. a single medical case).

Accordingly, there may be provided a concept that goes beyond conventional approaches that simply highlight generic or global confidence levels. For instance, proposed embodiments may associate a confidence measure to a ML model result/output for specific input data to the ML model. This may enable supplementary information (such as image overlays and associated textual descriptions) to be provisioned with a result, which may allow an expert (e.g. clinical expert, technician, data analyst, engineer, medical practitioner, radiologist, etc.) to quickly assess results of a model by focusing on results/output that are associated with a higher confidence measure.

ML models employed by embodiment may be built using conventional machine learning and/or image processing techniques, thus leveraging historical data and/or established knowledge to improve the accuracy of determinations/results provided by proposed embodiments.

An embodiment may be able to provide an estimation of confidence (e.g. measure of uncertainty) about a result associated with specific input data (e.g. an image feature or region). In this way, embodiments may help to identify input data and/or output results for which there is a high level of ML model uncertainty.

Accordingly, proposed embodiments may identify input data (e.g. medical image regions) important for a ML model output and also associate such input data with visual features (e.g. image overlays with associated textual descriptions) that can be useful to user (such as a medical practitioner for example). This may allow a user to quickly and easily validate results of a model and identify cases where the model does not make the correct or trustworthy decisions. Further, embodiments may identify an uncertainty (i.e. confidence measure) associated with each input data (e.g. each medical case). This may allow a user (such as a medical practitioner) to review the model output starting from the outputs that are most uncertain (i.e. have the lowest confidence measure) for example.

Improved (e.g. more accurate and/or easier) data analysis and case diagnosis of may therefore be facilitated by proposed embodiments. Embodiments may also be employed to improve the efficiency and/or effectiveness of a Clinical Decision Support (CDS) system. Improved CDS concepts may thus be provided by proposed embodiments.

Proposed embodiments may therefore be of particular relevance to medical data analysis and medical image analysis. For example, it may help to identify input/output data (e.g. medical cases or medical image features) for a ML model and identify an uncertainty (i.e. confidence measure) associated with a ML model output for the input data. Proposed concepts may thus also facilitate accurate assessment or diagnosis of the health of a subject using medical analysis. Accordingly, input data may comprise a medical data, medical image, or a feature of medial for example. Also, a result generated by processing input data with a ML model may comprise an inference, a medical decision, a diagnosis, a verdict or a recommendation.

In some proposed embodiments, determining a confidence measure may comprise: determining a measure of distribution or variance of the secondary results; and determining a confidence measure based on the determined measure of distribution or variance. For example, determining the measure of distribution or variance of the secondary results may comprise determining at least one of: the inverse variance of the secondary results; the Shannon entropy of the secondary results; the gini coefficient of the secondary results; the Kullback-Liebler divergence of the secondary results; and a concentration measure of the secondary results. Simple mathematical methods or formulae may therefore be employed to determine a confidence measure for a machine learning model. Straight-forward and reduced-complexity implementations that facilitate accurate and/or informed data analysis using a ML model may thus be realised.

It is to be understood that various approaches, methods or functions may be used to provide a confidence measure based on the secondary results. For instance, some embodiments may employ the inverse variance of the secondary results, whereas others may employ methods for measuring histograms of categorical data, such as Shannon entropy, gini coefficient, Kullback-Liebler (KL) divergence, etc. Alternatively, or additionally, concentration measures of empirical distribution may be employed.

In some embodiments, generating a plurality of modified instances of the input data may comprise: applying a first spatial warping transformation to the input data to generate a first modified instance of the input data. Simple modification/augmentation methods may therefore be employed to generate modified instances of the input data. This may also allow for control of the modifications that are made. Straight-forward and reduced-complexity implementations for generating modified instances of the input data may therefore be realised.

Further, embodiments may further comprise: applying a first inverse spatial warping transformation to the secondary result generated for the first modified instance of the input data. In this way, the result may be transformed back for comparison with result for the unmodified input data, thus enabling easier and/or more accurate assessment.

In some embodiments, generating a plurality of modified instances of the input data may comprise: adding noise to the input data to generate a second modified instance of the input data. Adding noise may enable simple addition of random modifications, thereby ensuring small, random perturbations to be made. Easy and reduced-complexity implementations that facilitate small or minor modifications to the input date may therefore be realised by proposed embodiments.

Also, generating a plurality of modified instances of the input data may comprise: applying a local deformation transformation (e.g. warping function) to the input data to generate a third modified instance of the input data. Further, such embodiments may also comprise applying a first inverse local deformation transformation to the secondary result generated for the third modified instance of the input data.

By way of example, the machine learning model may comprise an artificial neural network, a Generative Adversarial Network (GAN), a Bayesian network, or a combination thereof.

Embodiments may further comprise the step of associating the determined confidence measure with the primary result.

Embodiments may further comprise the step of generating an output signal based on the determined confidence measure. Embodiments may be adapted to provide such an output signal to at least one of: the subject; a medical practitioner; medical imaging apparatus operator; and a radiographer. The output signal may thus be provided to a user or medical apparatus for the purpose of indicating a computed result/decision and its associated confidence measure.

Some embodiments may further comprise the step of generating a control signal for modifying a graphical element based on the determined confidence measure. The graphical element may then be displayed in accordance with the control signal. In this way, a user (such as a radiologist) may have an appropriately arranged display system that can receive and display information about results provided by a machine learning model. Embodiments may therefore enable a user to remotely analyse results (e.g. outputs, decisions, inferences, etc.) from a deployed (e.g. client-side) machine learning model.

According to yet another aspect of the invention, there is provided computer program product for obtaining a confidence measure for a machine learning model, wherein the computer program product comprises a computer-readable storage medium having computer-readable program code embodied therewith, the computer-readable program code configured to perform all of the steps of an embodiment when executed on at least one processor.

A computer system may be provided which comprises: a computer program product according to an embodiment; and one or more processors adapted to perform a method according to an embodiment by execution of the computer-readable program code of said computer program product.

In a further aspect, the invention relates to a computer-readable non-transitory storage medium comprising instructions which, when executed by a processing device, execute the steps of the method for feature identification in medical imaging of a subject according to an embodiment.

According to another aspect of the invention, there is provided a system for obtaining a confidence measure for a machine learning model, the system comprising: an input interface configured to obtain input data; a data modification component configured to generate a plurality of modified instances of the input data; a machine learning model interface configured to communicate the input data and the plurality of modified instances of the input data to a machine learning model and further configured to receive a primary result generated by the machine learning model processing the input data and to receive a plurality of secondary results generated by the machine learning model processing the respective plurality of modified instances of the input data; and an analysis component configured to determine a confidence measure relating to the primary result based on the secondary results.

It will be appreciated that all or part of a proposed system may comprise one or more data processors. For example, the system may be implemented using a single processor which is adapted to undertake data processing in order to determine a confidence measure for a deployed machine learning model.

The system for obtaining a confidence measure for a machine learning model may be remotely located from the machine learning model, and data may be communicated between the machine learning model and the system unit via a communication link.

The system may comprise: a server device comprising the input interface, data modification component and machine learning model interface; and a client device comprising the analysis component. Dedicated data processing means may therefore be employed for the purpose of determining a confidence measure, thus reducing processing requirements or capabilities of other components or devices of the system.

The system comprises a client device, wherein the client device comprises the input interface, data modification component, the client-side machine learning model and the analysis component. In other words, a user (such as a medical professional) may have an appropriately arranged client device (such as a laptop, tablet computer, mobile phone, PDA, etc.) which processes received input data (e.g. medical data) in order to generate a primary result and an associated confidence measure.

Thus, processing may be hosted at a different location from where the input data is generated and/or processed. For example, for reasons of computing efficiency it might be advantageous to execute only part of the processing at particular location, thereby reducing associated costs, processing power, transmission requirements, etc.

Thus, it will be understood that processing capabilities may therefore be distributed throughout the system in different ways according to predetermined constraints and/or availability of processing resources.

Embodiments may also enable some of the processing load to be distributed throughout the system. For example, pre-processing may be undertaken at a data acquisition system (e.g. medical imaging/sensing system). Alternatively, or additionally, processing could be undertaken at a communication gateway. In some embodiments, processing may be undertaken at a remote gateway or sever, thus relinquishing processing requirements from an end-user or output device. Such distribution of processing and/or hardware may allow for improved maintenance abilities (e.g. by centralising complex or expensive hardware in a preferred location). It may also enable computational load and/or traffic to be designed or located within a networked system according to the processing capabilities available. A preferable approach may be to process initial/source data locally and transmit extracted data for full processing at a remote server.

Embodiments may be implemented in conjunction with pre-existing, pre-installed or otherwise separately-provisioned machine learning models. Other embodiments may be provided with (e.g. integrated into) new apparatus comprising machine learning models.

These and other aspects of the invention will be apparent from and elucidated with reference to the embodiment(s) described hereinafter.

BRIEF DESCRIPTION OF THE DRAWINGS

Examples in accordance with aspects of the invention will now be described in detail with reference to the accompanying drawings, in which.

DETAILED DESCRIPTION OF THE EMBODIMENTS

Proposed is a concept for obtaining a confidence measure for a machine learning model. Further, the confidence measure may be associated with specific input data provided to the machine learning model. Embodiments may thus enable the provision of information that may be useful for assessing a model output.

In particular, a confidence measure may be determined by modifying (or augmenting) input data and analysing results provided by the ML model for the modified (or augmented) input data. For instance, input data may be automatically subjected to a number of different modifications (or augmentations), which are subsequently processed by the ML model. The ML model outputs (i.e. results) for the modified (or augmented) data may then be analysed to assess the robustness or variability of the results. This may enable a confidence measure for the ML model to be determined.

For example, a confidence measure associated with input data for the ML model may be determined, and this may be based on a variance of the ML model outputs (i.e. results) for the modified (or augmented) input data.

Association of such confidence measures with input data for a ML model may enable indications (e.g. a graphic overlay with textual description of the associated confidence measure) to be associated with a ML model output for input data. This may facilitate simple and quick assessment of ML model results (e.g. by identifying outputs that the model is less confident about).

Embodiments may provide an estimation of uncertainty about ML model outputs. Proposed embodiments may therefore, for example, be useful for identifying if an output of a client-side ML model (e.g. provided by processing specific input data) is reliable.

Embodiments may, for example, be useful for improving medical data analysis for subjects. Illustrative embodiments may thus be utilized in many different types of medical assessment apparatus and/or medical assessment facilities, such as a hospital, ward, research facility, etc.

By way of example, ML model output confidence assessment may be useful for understanding and/or evaluating decisions made by a ML model. Using a proposed embodiment, a user may, for example, identify model outputs/ results that are less or more reliable.

Also, embodiments may be integrated in data analysis systems or ML decision system to provide real-time information to users (e.g. technicians, data analysts) regarding results. Using such information, a technician may check model outputs and/or decisions and, if necessary, adapt or modify the outputs and/or decisions.

Proposed embodiments may identify uncertain decisions or outputs from ML model. Such decisions/output may then be focussed upon and/or improved (e.g. via learning from further sources of information).

In order to provide a context for the description of elements and functionality of the illustrative embodiments, the Figures are provided hereafter as examples of how aspects of the illustrative embodiments may be implemented. It should therefore be appreciated that the Figures are only examples and are not intended to assert or imply any limitation with regard to the environments, systems or methods in which aspects or embodiments of the present invention may be implemented.

Embodiments of the present invention may be directed toward enabling ML model results to be potentially classified. This may be useful for assessing deployed (e.g. client-side) ML models, e.g. by identifying uncertain decisions or outputs. This may help to reduce the impact of incorrect or inaccurate decisions and thus provide improved data analysis. Embodiments may therefore be useful for real-time data assessment purposes, for example to assess if a medical image analysis model is suitable for a specific subject and/or medical scanning process.

Figure 1:
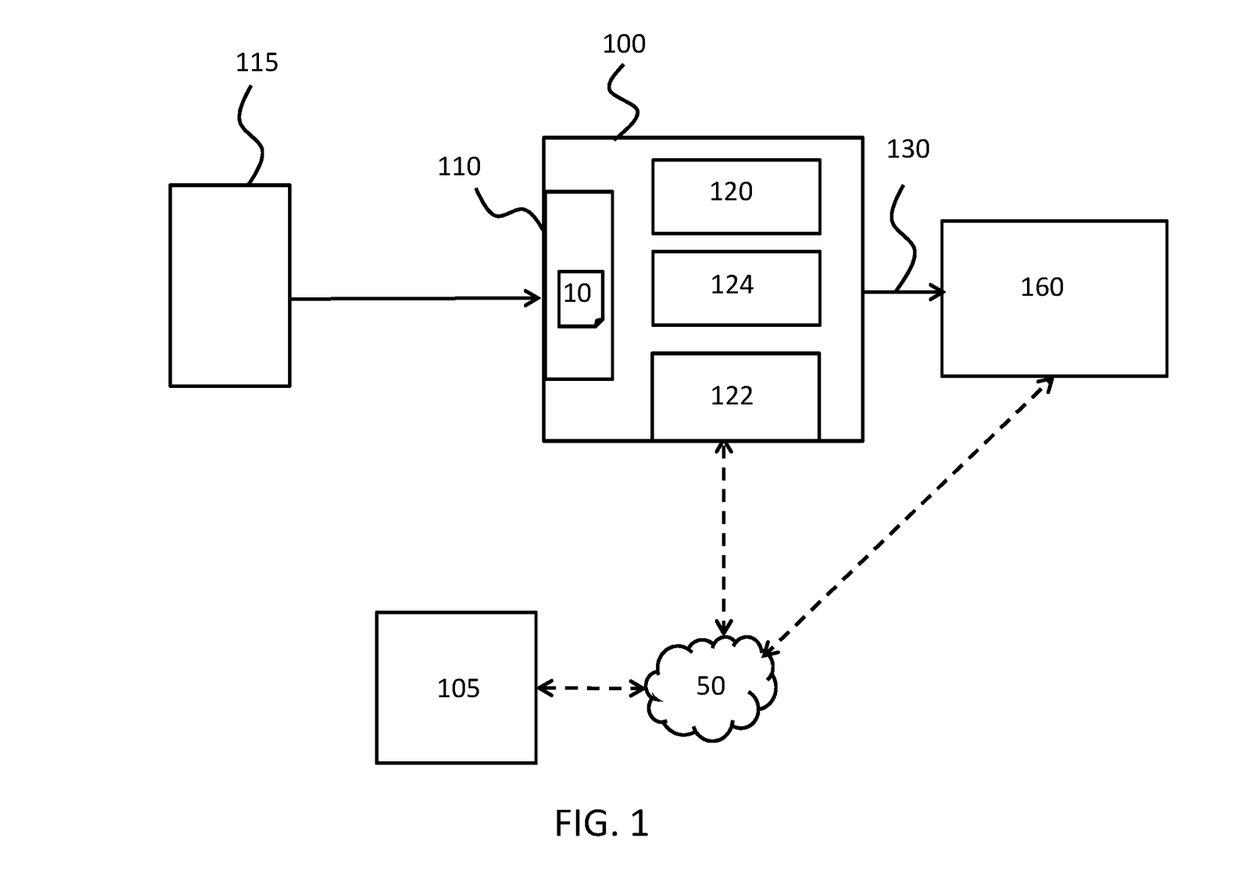
FIG. 1 is a simplified block diagram of a system for obtaining a confidence measure for a machine learning model according to an embodiment.

FIG. 1 shows an embodiment of a system 100 for obtaining a confidence measure for a ML model 105 according to an embodiment. Here, the ML model 105 is a deployed to a client, and so has already been trained and finalised. Client-side retraining of the ML model 105 is therefore not viable or possible.

The system 100 comprises an interface component 110 adapted to obtain input data 10. Here, the interface component 110 is adapted to receive the input data 10 in the form of a medical image 10 from medical imaging apparatus 115 (such as a MRI device for example).

The medical image 10 is communicated to the interface component 110 via a wired or wireless connection. By way of example, the wireless connection may comprise a short-to-medium-range communication link. For the avoidance of doubt, short-to-medium-range communication link may be taken to mean a short-range or medium-range communication link having a range of up to around one hundred (100) meters. In short-range communication links designed for very short communication distances, signals typically travel from a few centimetres to several meters, whereas, in medium-range communication links designed for short to medium communication distances, signals typically travel up to one hundred (100) meters. Examples of short-range wireless communication links are ANT+, Bluetooth, Bluetooth low energy, IEEE 802.15.4, ISA100a, Infrared (IrDA), Near Field Communication (NFC), RFID, 6LoWPAN, UWB, Wireless HART, Wireless HD, Wireless USB, ZigBee. Examples of medium-range communication links include Wi-Fi, ISM Band, Z-Wave. Here, the output signals are not encrypted for communication via the wired or wireless connection in a secured manner. However, it will be appreciated that, in other embodiments, one or more encryption techniques and/or one or more secure communication links may be employed for the communication of signals/ data in the system.

The system 100 also comprises a data modification component 120 configured to configured to generate a plurality of modified instances of the input data. In particular, the data modification component 120 of this embodiment is configured to apply a plurality of different spatial warping transformations to the medical image 10 to generate a respective plurality of modified instances of the medical image 10. In this way, the data modification component 120 makes small/ minor modifications to the medical image 10 in order to generate a plurality of modified (or augmented) versions of the medical image.

The system 100 further comprises a ML model interface 122 that is configured to communicate the medical image 10 and the plurality of modified instances of the medical image to the ML model 105. For this purpose, the machine learning model interface 122 of the system 100 may communicate machine learning model 105 via the internet or "cloud" 50.

In response to receiving the medical image 10 and the plurality of modified instances of the medical image, the ML model processes the received data to generate respective results. More specifically, the medical image 10 is processed by the ML model 105 to generate a primary result, and the modified instances of the input data are processed by the ML model 105 to generate a respective plurality of secondary results.

These results generated by the ML model 105 are then communicated back to system 100. The machine learning model interface 122 is thus further configured to receive the primary result (generated by the ML model 105 processing the medical image 10) and to receive the plurality of secondary results (generated by the ML model 105 processing the respective plurality of modified instances of the medical image 10).

In this embodiment, because the data modification component 120 applied a plurality of different spatial warping transformations to the medical image 10 (to generate the respective plurality of modified instances of the medical image 10), the data modification component 120 is further configured to apply respective inverse spatial warping transformations the received plurality of secondary results. In this way, the secondary results are transformed back, or normalised, for reference against the primary result.

Here, it is noted that, for this purpose applying transformations and/or inverse transformations, the data modification component 120 may communicate with one or more data processing resources available in the internet or "cloud" 50. Such data processing resources may undertake part or all of the processing required to implement the transformations. Thus, it will be appreciated that the embodiment may employ distributed processing principles.

The system 100 further comprises an analysis component 124 configured to determine a confidence measure based on the secondary results. Here, the analysis component 124 is configured to determine a confidence measure based on the inverse variance of the secondary results. A high value for the confidence measure is thus obtain when the variance of the secondary results is low. Conversely, a low value for the confidence measure is obtain when the variance of the secondary results is high. The confidence measure is then associated with the input medical image 10 and its primary result from being processed by the ML model 105.

Again, it is noted that, for the purpose of determining a confidence measure based on the secondary results, the analysis component 124 may communicate with one or more data processing resources available in the internet or "cloud" 50. Such data processing resources may undertake part or all of the processing required to determining a confidence measure. Thus, it will be appreciated that the embodiment may employ distributed processing principles.

The analysis component 124 is further adapted to generate an output signal 130 representative of primary result and the determined confidence measure. In other words, after determining a level of reliability of the primary result, an output signal 130 representative of level of reliability of the primary result is generated.

The system further comprises a graphical user interface (GUI) 160 for providing information to one or more users. The output signal 130 is provided to the GUI 160 via wired or wireless connection. By way of example, the wireless connection may comprise a short-to-medium-range communication link. As indicated in FIG. 1, the output signal 130 is provided to the GUI 160 from the data processing unit 110. However, where the system, has made use of data processing resources via the internet or cloud 50), an output signal may be made available to the GUI 160 via the internet or cloud 50.

Based on the output signal 130, the GUI 160 is adapted to communicate information by displaying one or more graphical elements in a display area of the GUI 160. In this way, the system may communicate information about a result of processing the medical image 10 with the ML model 105 that may be useful for indicating a level of certainty or confidence associated with processing result. For example, the GUI 160 may be used to display graphical elements to a medical practitioner, a data analyst, an engineer, a medical imaging apparatus operator, a technician or the like.

Although the example embodiment of FIG. 1 detailed above is described in relation to a medical imaging, it will be appreciated that proposed concepts may be extended to other forms of input data, such a medical case notes, engineering images, etc.

Also, from the above description, it will be understood that the ML model may be of any suitable form. For example, the ML model may comprise an artificial neural network, a Generative Adversarial Network (GAN), a Bayesian network, or a combination thereof.

From the above description of FIG. 1, it will be appreciated that embodiments may provide an estimate of confidence in a result returned from a ML model. The estimate of confidence may be derived by means of input data augmentation/modification and obtained for a deployed ML model at the client side.

Embodiments may be premised on a proposal that an accurate, or reliable/trustworthy, ML model should be "well behaved", i.e. small perturbations to input data should have a small, corresponding effect on the output data. To analyze a ML model, input data (e.g. a new case) to be processed a new case is subjected to a plurality of augmentations/modifications, which are then all processed by the ML-model. The variance of the results from processing the augmented/modified inputs may then be used to determine a measure of confidence (which may be representative of an accuracy, robustness or reliability of the ML model). In this way, embodiments may provide an input-specific (e.g. case-specific) confidence measure, and this may be independent of any claims or suggestions made by the provider of the ML model.

Proposed embodiments may therefore be summarized as being based on a proposal to interpret a ML model's generalization capacity as a continuity property. In other words, if a ML model (such as a neural network) generalizes well to an unseen input data (e.g. case $C_0$), small perturbations to the input data ($C_0$) should have only a small, corresponding impact on the ML model output.

Embodiments may apply to the client-side deployment phase of the deep learning module (not the training phase).

By way of further example, a method for obtaining a confidence measure for a ML model according to an embodiment may be summarised as follows:

(i) A new case $C_0$ is input to the ML model, yielding a specific, primary result $R_0$; In case of semantic segmentation via voxel-wise labelling, $C_0$ corresponds to the input image volume and $R_0$ corresponds to a volume of equal size where each voxel contains the label information, e.g. a single integer value designating a class to the corresponding image voxel in $C_0$. Alternatively, $R_0$ may contain for each voxel from $C_0$ a probability vector whose entries correspond the associated class probabilities. For example, of an ML model which can decide between n different classes, the vector associated to a certain image voxel is composed of n entries summing up to unity.

(ii) Case $C_0$ is modified ('augmented') in multiple ways, e.g. by spatial registration to other patients, by arbitrary local deformations (warps), by adding noise, etc, or combination of these methods; In the case of semantic segmentation, when applying a spatial transformation, for each voxel in the warped image the coordinate in the original image is stored.

(iii) Each augmented version $C_i$ of $C_0$ is also passed to the ML-model, yielding one, corresponding result $R_i$ each; For semantic segmentation, a commonly used ML models is the U-Net architecture.

(iv) The primary result $R_0$ is provided to a user, supplemented with the variability of the set $\{R_i\}$ which indicates a level of confidence associated with the primary result $R_0$ (wherein the level of confidence is inversely proportional to the variability of the set $\{R_i\}$); For semantic segmentation, the level of confidence is computed for each voxel individually.

For each voxel in $C_0$ we lookup the corresponding location in each $C_i$ and collect the ML algorithm's output from $R_i$. All outputs associated to the voxel under consideration are summarized using a histogram (summary of class frequencies). Based on the analysis of the histogram and the associated empirical distribution, various certainty measures such as the Shannon-entropy (i.e. $H(X)=\Sigma_{i=0}^{N-1} p_i \log_2 p_i$H(X), where $p_i$ is the probability of a given symbol) or the Gini-coefficient (which is equal to the area below the line of perfect equality (0.5 by definition) minus the area below the Lorenz curve, divided by the area below the line of perfect equality. In other words, double the area between the Lorenz curve and the line of perfect equality) can be computed.

For voxel-wise labelling (e.g. semantic segmentation) and localization tasks, the use of augmentation by diffeomorphic spatial transformations (e.g. rigid, affine, diffeomorphic warps) may allow embodiments to uniquely transform back the resulting label image or localization coordinates to the original voxel grid (by applying the inverse transformation). Thus, in a labelling task, for each voxel in an original voxel grid, a whole population of labels is generated. In addition to the Shannon-entropy or the Gini-coefficient mentioned above, the sample variance of this label population can then be used to derive a quantitative voxel-wise confidence measure. More precisely, the confidence is inversely related to the sample variance or Shannon-entropy.

For visualization, the confidence can be coded as the colour saturation or opacity in a display using colour hue for class labels. In a localization task, a whole set of point locations may be generated and their distribution can likewise be overlaid as individual points or via a fitted point density function, e.g. using a normal distribution.

For classification tasks, the proportion of class assignments {R} deviating from the class $R_0$ (which was assigned by the network to $C_0$) may provide a measure of robustness (i.e. confidence measure) with respect to the transformations used for augmentation.

Figure 2:
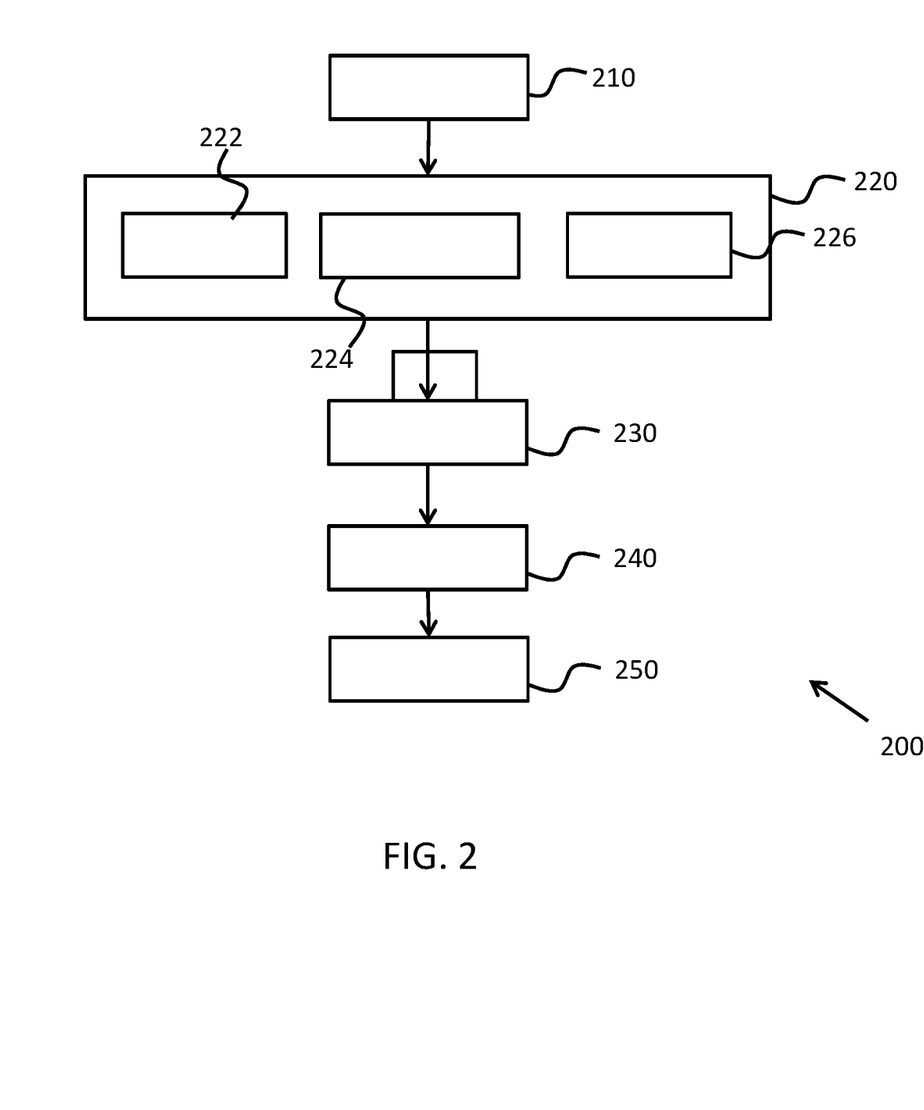
FIG. 2 is a flow diagram of a method for obtaining a confidence measure for a machine learning model according to an embodiment.

Referring now to FIG. 2, there is depicted a flow diagram of a method 200 for obtaining a confidence measure for a ML model. For the purpose of this example, the ML model comprises at least one of: an artificial neural network; a Generative Adversarial Network (GAN); and a Bayesian network.

In FIG. 2, the step 210 comprises processing input data $d_0$ with the ML model to generate a primary result $R_0$.

Step 220 comprises generating a plurality of modified instances ($d_i$, $d_{ii}$, $d_{iii}$) of the input data $d_0$. More particularly, step 220 of generating a plurality of modified instances of the input data comprises multiple steps, namely steps 222, 224, 226. Step 222 comprises applying a first spatial warping transformation (e.g. a rigid or affine transformation) to the input data $d_0$ to generate a first modified instance $d_i$ of the input data. Step 224 comprises adding noise to the input data $d_0$ to generate a second modified instance $d_{ii}$ of the input data. Step 226 comprises applying a local deformation transformation to the input data $d_0$ to generate a third modified instance $d_{iii}$ of the input data.

Step 230 comprises processing the plurality of modified instances ($d_i$, $d_{ii}$, $d_{iii}$) of the input data with the ML model to generate a respective plurality of secondary results ($R_i$, $R_{ii}$, $R_{iii}$). Here it is noted that, where appropriate, the secondary results may also be transformed back (i.e. normalised) to be comparable with the primary result $R_0$ using respective inverse transformations. For instance, an inverse spatial warping transformation is applied the secondary result $R_i$ generated for the first modified instance $d_i$ of the input data. Also, an inverse local deformation transformation is applied to the secondary result $R_{iii}$ generated for the third modified instance $d_{iii}$ of the input data.

Step 240 comprises determining a confidence measure relating to the ML model based on the (normalised) secondary results ($R_i$, $R_{ii}$, $R_{iii}$). Here, determining a confidence measure comprises determining a confidence measure based on the inverse variance of the (normalised) secondary results ($R_i$, $R_{ii}$, $R_{iii}$). As mentioned above, in other embodiments, determining a confidence measure may comprise determining the Shannon-entropy or the Gini-coefficient.

The exemplary embodiment of FIG. 2 also includes the step 250 of associating the determined confidence measure with the primary result $R_0$. In this way, a simple representation of the primary result's $R_0$ reliability can be generated and associated with the primary result $R_0$. This may enable a user to quickly and easily identify and assess the importance and/or relevance of the primary result $R_0$ with respect to analysing a ML model's decision or output for the input data $d_0$.

Figure 3:
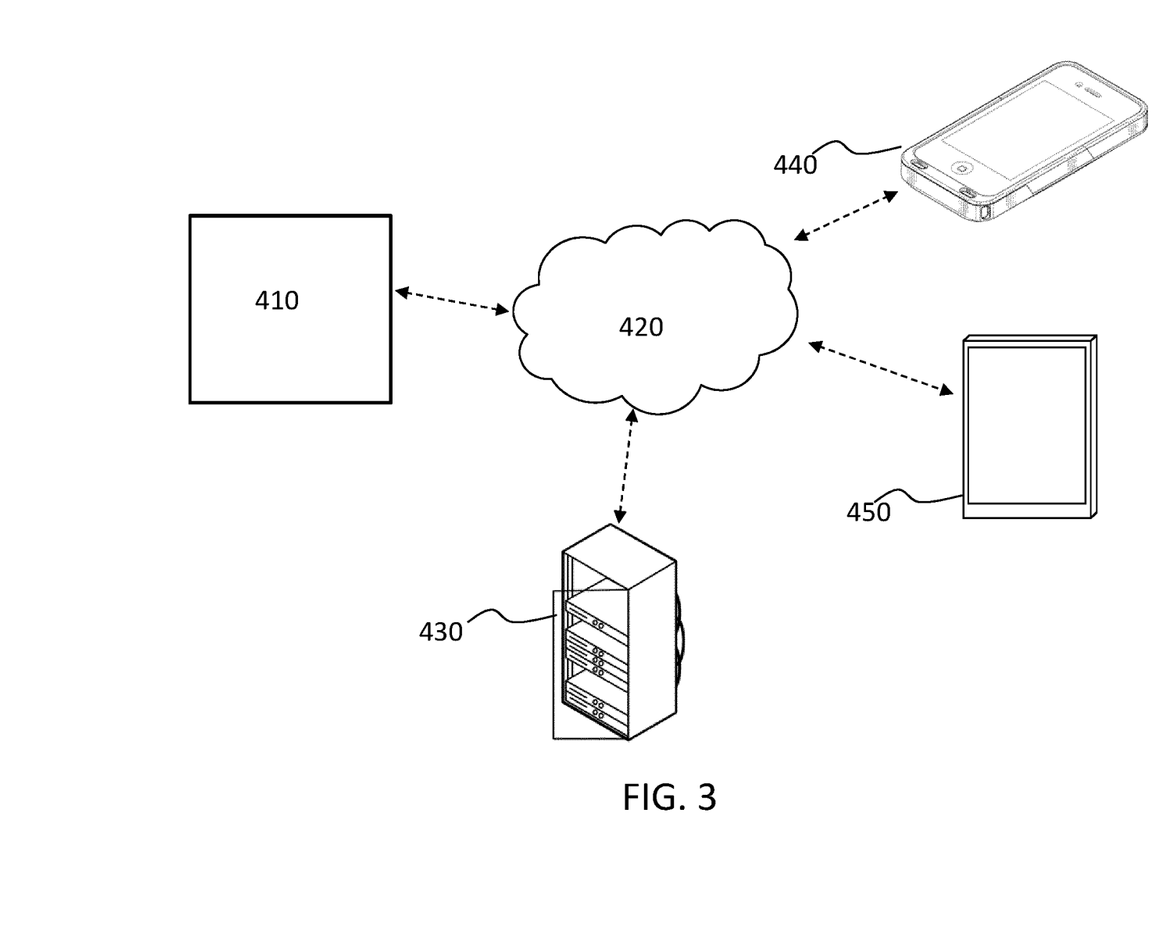
FIG. 3 is a simplified block diagram of a system for obtaining a confidence measure for a machine learning model according to another embodiment.

Referring now to FIG. 3, there is depicted another embodiment of a system according to the invention comprising a ML model 410 adapted. Here, the ML model 410 comprises a conventional neural network 410 that may, for example, be available for use in a medical/clinical decision service.

The neural network 410 communicates output signals representative of results or decisions from processing input data via the internet 420 (using a wired or wireless connection for example) to a remotely-located data processing system 430 for obtaining a confidence measure for a ML model (such as server).

The data processing system 430 is adapted to obtain and process input data in accordance with a method according to a proposed embodiment to identify confidence measure for the ML model 410.

More specifically, the data processing system 430 obtains input data and generates a plurality of modified instances of the input data. The data processing system 430 then communicates the input data and the plurality of modified instances of the input data to a ML model 410. The ML model 410 processes the data received from data processing system 430 to generate respective results. More specifically, the input data is processed by the ML model 410 to generate a primary result, and the modified instances of the input data are processed by the ML model 410 to generate a respective plurality of secondary results. The data processing system 430 then obtains, from the ML model 410, the primary result and the plurality of secondary results. Based on the variability of the secondary results, the data processing system 430 determines a confidence measure for the primary result created by the ML model 410.

The data processing system 430 is further adapted to generate output signals representative of the confidence measure. Thus, the data processing system 430 provides a centrally accessible processing resource that can received input data and run one or more algorithms to identify and classify a reliability of a primary result (e.g. decision) output by a ML model 410 for the input data. Information relating to the obtained confidence measure can be stored by the data processing system (for example, in a database) and provided to other components of the system. Such provision of information about a ML model and primary result may be undertaken in response to a receiving a request (via the internet 420 for example) and/or may be undertaken without request (i.e. 'pushed').

For the purpose of receiving information about a reliability of a ML model or primary result, and thus to enable the model/data analysis or assessment, the system further comprises first 440 and second 450 mobile computing devices.

Here, the first mobile computing device 440 is a mobile telephone device (such as a smartphone) with a display for displaying graphical elements representative of confidence measures. The second mobile computing device 450 is a mobile computer such as a Laptop or Tablet computer with a display for displaying graphical elements representative of ML model results and associated confidence measures.

The data processing system 430 is adapted to communicate output signals to the first 440 and second 450 mobile computing devices via the internet 420 (using a wired or wireless connection for example). As mentioned above, this may be undertaken in response to receiving a request from the first 440 or second 450 mobile computing devices.

Based on the received output signals, the first 440 and second 450 mobile computing devices are adapted to display one or more graphical elements in a display area provided by their respective display. For this purpose, the first 440 and second 450 mobile computing devices each comprise a software application for processing, decrypting and/or interpreting received output signals in order to determine how to display graphical elements. Thus, the first 440 and second 450 mobile computing devices each comprise a processing arrangement adapted to determine one or more values representative of confidence measures, and to generate a display control signal for modifying at least one of the size, shape, position, orientation, pulsation or colour of the graphical element based on the confidence measures.

The system can therefore communicate information about features in ML model results to users of the first 440 and second 450 mobile computing devices. For example, each of the first 440 and second 450 mobile computing devices may be used to display graphical elements to a medical practitioner, a data analyst or a technician.

Implementations of the system of FIG. 3 may vary between: (i) a situation where the data processing system 430 communicates display-ready data, which may for example comprise display data including graphical elements (e.g. in JPEG or other image formats) that are simply displayed to a user of a mobile computing device using conventional image or webpage display (which can be web based browser etc.); to (ii) a situation where the data processing system 430 communicates raw data information that the receiving mobile computing device then processes to generate a primary result and an associated confidence measure (for example, using local software running on the mobile computing device). Of course, in other implementations, the processing may be shared between the data processing system 430 and a receiving mobile computing device such that part of the data generated at data processing system 430 is sent to the mobile computing device for further processing by local dedicated software of the mobile computing device. Embodiments may therefore employ server-side processing, client-side processing, or any combination thereof.

Further, where the data processing system 430 does not 'push' information (e.g. output signals), but rather communicates information in response to receiving a request, the user of a device making such a request may be required to confirm or authenticate their identity and/or security credentials in order for the information to be communicated.

The present invention may be a system, a method, and/or a computer program product for obtaining a confidence measure for a machine learning model. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

From the above description, it will be appreciated that embodiments may therefore be useful for determining a confidence measure independent of the ML model provider claims. This confidence measure may be input data specific (e.g. specific to an input case). Accordingly, embodiment may provide information that may be employed as a robustness measure for classification and detection tasks. Also, the data modification/augmentation may be designed specifically with respect to a particular use case.

Proposed embodiments may therefore be applicable to a wide range of data analysis concepts/fields, including medical data analysis and clinical decision support applications. For instance, embodiments may be useful for medical image screening, where medical images of a subject are used to investigate and/or assess the subject. For such cases, pixel-level information about the classification uncertainty (i.e. decision confidence) can be provided, which may explain or supplement a ML model output for a medical professional (e.g. radiologist).

The description has been presented for purposes of illustration and description, and is not intended to be exhaustive or limited to the invention in the form disclosed. Many modifications and variations will be apparent to those of ordinary skill in the art. Embodiments have been chosen and described in order to best explain principles of proposed embodiments, practical application(s), and to enable others of ordinary skill in the art to understand that various embodiments with various modifications are contemplated.

The invention claimed is:

1. A method for obtaining a confidence measure for a machine learning model, the method comprising:
processing input data with the machine learning model to generate a primary result;
generating a plurality of modified instances of the input data;
processing the plurality of modified instances of the input data with the machine learning model to generate a respective plurality of secondary results; and
determining a confidence measure relating to the primary result based on the secondary results,
wherein determining a confidence measure comprises:
determining a measure of distribution or variance of the secondary results; and
determining a confidence measure based on the determined measure of distribution or variance,
wherein determining the measure of distribution or variance of the secondary results comprises determining at least one of:
the inverse variance of the secondary results;
the Shannon entropy of the secondary results;
the gini coefficient of the secondary results;
the Kullback-Liebler divergence of the secondary results; and
a concentration measure of the secondary results,
wherein generating a plurality of modified instances of the input data comprises:
applying a first spatial warping transformation to the input data to generate a first modified instance of the input data,
applying a first inverse spatial warping transformation to the secondary result generated for the first modified instance of the input data.

2. The method of claim 1, wherein generating a plurality of modified instances of the input data comprises:
adding noise to the input data to generate a second modified instance of the input data.

3. The method of claim 1, wherein generating a plurality of modified instances of the input data comprises:
applying a local deformation transformation to the input data to generate a third modified instance of the input data.

4. The method of claim 3, further comprising:
applying a first inverse local deformation transformation to the secondary result generated for the third modified instance of the input data.

5. The method of claim 1, wherein the machine learning model comprises at least one of:
an artificial neural network;
a Generative Adversarial Network, GAN; and
a Bayesian network.

6. The method of claim 1, further comprising:
associating the determined confidence measure with the primary result.

7. A non-transitory computer readable medium storing instructions for obtaining a confidence measure for a machine learning model that, when executed by one or more processors, causes the one or more processors to:
process input data with the machine learning model to generate a primary result;
generate a plurality of modified instances of the input data;
process the plurality of modified instances of the input data with the machine learning model to generate a respective plurality of secondary results; and
determine a confidence measure relating to the primary result based on the secondary results, wherein determining a confidence measure comprises:
determining a measure of distribution or variance of the secondary results; and
determining a confidence measure based on the determined measure of distribution or variance,
wherein determining the measure of distribution or variance of the secondary results comprises determining at least one of:
the inverse variance of the secondary results;
the Shannon entropy of the secondary results;
the gini coefficient of the secondary results;
the Kullback-Liebler divergence of the secondary results; and
a concentration measure of the secondary results,
wherein generating a plurality of modified instances of the input data comprises:
applying a first spatial warping transformation to the input data to generate a first modified instance of the input data, applying a first inverse spatial warping transformation to the secondary result generated for the first modified instance of the input data.

8. A system for obtaining a confidence measure for a machine learning model, the system comprising:
an input interface configured to obtain input data;
a data modification component configured to generate a plurality of modified instances of the input data;
a machine learning model interface configured to communicate the input data and the plurality of modified instances of the input data to a machine learning model and further configured to receive a primary result generated by the machine learning model processing the input data and to receive a plurality of secondary results generated by the machine learning model processing the respective plurality of modified instances of the input data; and
an analysis component configured to determine a confidence measure relating to the primary result based on the secondary results, wherein the data modification component is configured to apply a first spatial warping transformation to the input data to generate a first modified instance of the input data, wherein the analysis component is configured to determine a measure of distribution or variance of the secondary results and to determine a confidence measure based on the determined measure of distribution or variance, wherein determining the measure of distribution or variance of the secondary results comprises determining at least one of:
the inverse variance of the secondary results;
the Shannon entropy of the secondary results;
the gini coefficient of the secondary results;
the Kullback-Liebler divergence of the secondary results; and
a concentration measure of the secondary results, wherein the data modification component is further configured to apply a first inverse spatial warping transformation to the secondary result generated for the first modified instance of the input data.

* * * * *